US007100648B2

(12) United States Patent
Chuang

(10) Patent No.: US 7,100,648 B2
(45) Date of Patent: Sep. 5, 2006

(54) PLANE-BLADE ADJUSTING DEVICE FOR A PLANING MACHINE

(76) Inventor: Bor-Yann Chuang, No. 78, Yungfeng Rd., Taiping Shiang, Taichung (TW) 411

( * ) Notice: Subject to any disclaimer, the term of this patent is extended or adjusted under 35 U.S.C. 154(b) by 0 days.

(21) Appl. No.: 10/995,386

(22) Filed: Nov. 24, 2004

(65) Prior Publication Data

US 2006/0108025 A1 May 25, 2006

(51) Int. Cl.
*B27C 1/00* (2006.01)
*B27C 5/00* (2006.01)
*B23P 15/38* (2006.01)

(52) U.S. Cl. .................. 144/117.1; 144/218; 144/225; 407/45; 83/698.51

(58) Field of Classification Search ............. 144/114.1, 144/117.1, 218, 220, 221, 230, 225; 409/232, 409/234; 407/32, 37, 45, 36; 83/633, 674, 83/698.11, 698.41, 698.51, 698.61
See application file for complete search history.

(56) References Cited

U.S. PATENT DOCUMENTS

| | | | | |
|---|---|---|---|---|
| 4,475,425 A * | 10/1984 | Punater et al. | ........... | 83/699.61 |
| 5,044,570 A * | 9/1991 | Montgomery, Sr. | ......... | 241/294 |
| 5,398,739 A * | 3/1995 | Everts et al. | ............... | 144/225 |
| 6,626,214 B1 * | 9/2003 | Hu | ............................ | 144/221 |

* cited by examiner

*Primary Examiner*—Derris H. Banks
*Assistant Examiner*—Shelley Self
(74) *Attorney, Agent, or Firm*—Troxell Law Office, PLLC

(57) ABSTRACT

A plane-blade adjusting device for a planing machine includes a blade shaft, a plurality of plane blades, plural covers and plural eccentric tubular posts. The blade shaft body is provided with plural set flat surfaces for each plane blade to rest on and then each cover secured on the plane blade and screwed tightly. The eccentric tubular post has an eccentric rotary portion formed in an upper portion, fitting in the rectangular hole of each plane knife and secured tightly on the shaft body for sandwiching a plane blade on the shaft body. So the eccentric tubular post is rotated to shift each plane blade up and down in a micro-distance with easiness, quickness and accuracy.

6 Claims, 5 Drawing Sheets

PLANE-BLADE ADJUSTING DEVICE FOR A PLANING MACHINE

BACKGROUND OF THE INVENTION

1. Field of the Invention

This invention relates to a plane-blade adjusting device for a planing machine, particularly to one adjusting plural plane blades of the planing machine in a vertical direction with easiness, quickness and accurateness.

2. Description of the Prior Art

Conventional planing machines have a plane-blade shaft for fixing a plane blade, and when the plane-blade shaft is rotated, the plane-blade will perform planing to a work. The plane-blade in the conventional planing machine is fixed tightly with a cover on the plane shaft by screws, clamping the plane blade between the cover and the plane-blade shaft. Therefore, when the plane blade is to be adjusted in a vertical direction, the screws on the cover have to be in advance loosened, and then the rectangular hole of the plane blade has to be moved relative to the screw of the rectangular hole properly, and again the screws have to be tightened, for controlling the depth of a work to be planed off.

However, the plane blade in the conventional planing machine has to be adjusted completely with a hand, so its accuracy may not be accurate in a micro degree, and in addition, it takes rather much time

SUMMARY OF THE INVNETION

A plane-blade adjusting device for a planing machine includes a blade shaft, a cover secured on the blade shaft body for sandwiching a plane blade, and an eccentric tubular post at least provided in the blade shaft. The eccentric tubular post has an eccentric rotary portion in an upper portion to contact a rectangular hole of the plane blade so that the plane blade may be shifted up and down in a micro degree with easiness, quickness, and accuracy, when the eccentric tubular post is micro-rotated.

BRIEF DESCRIPTION OF DRAWINGS

This invention will be better understood by referring to the accompanying drawings, wherein.

DETAILED DESCRIPTION OF THE PREFERRED EMBODIMENT

Figure 1:
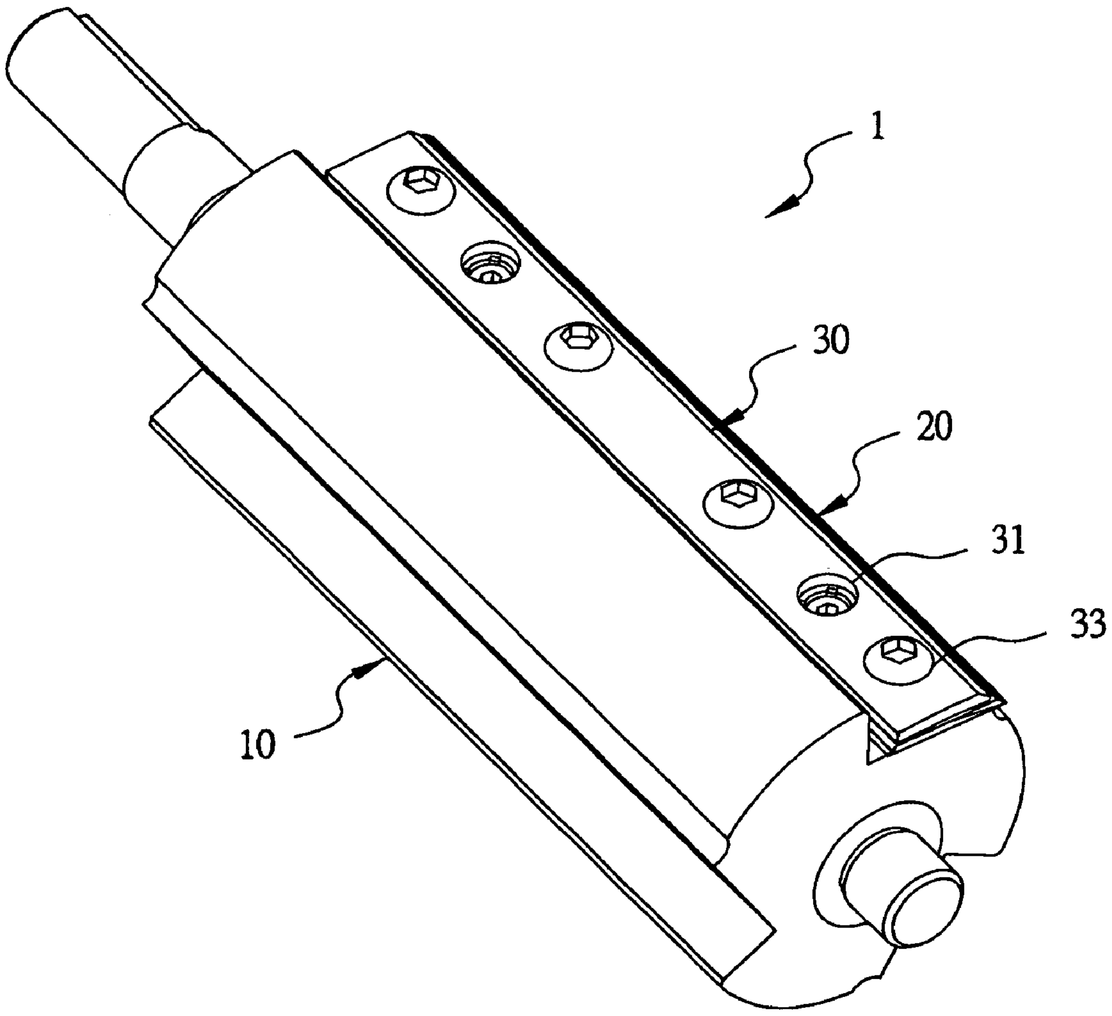
FIG. 1 is a perspective view of a plane-blade shaft in the present invention.
Figure 2:
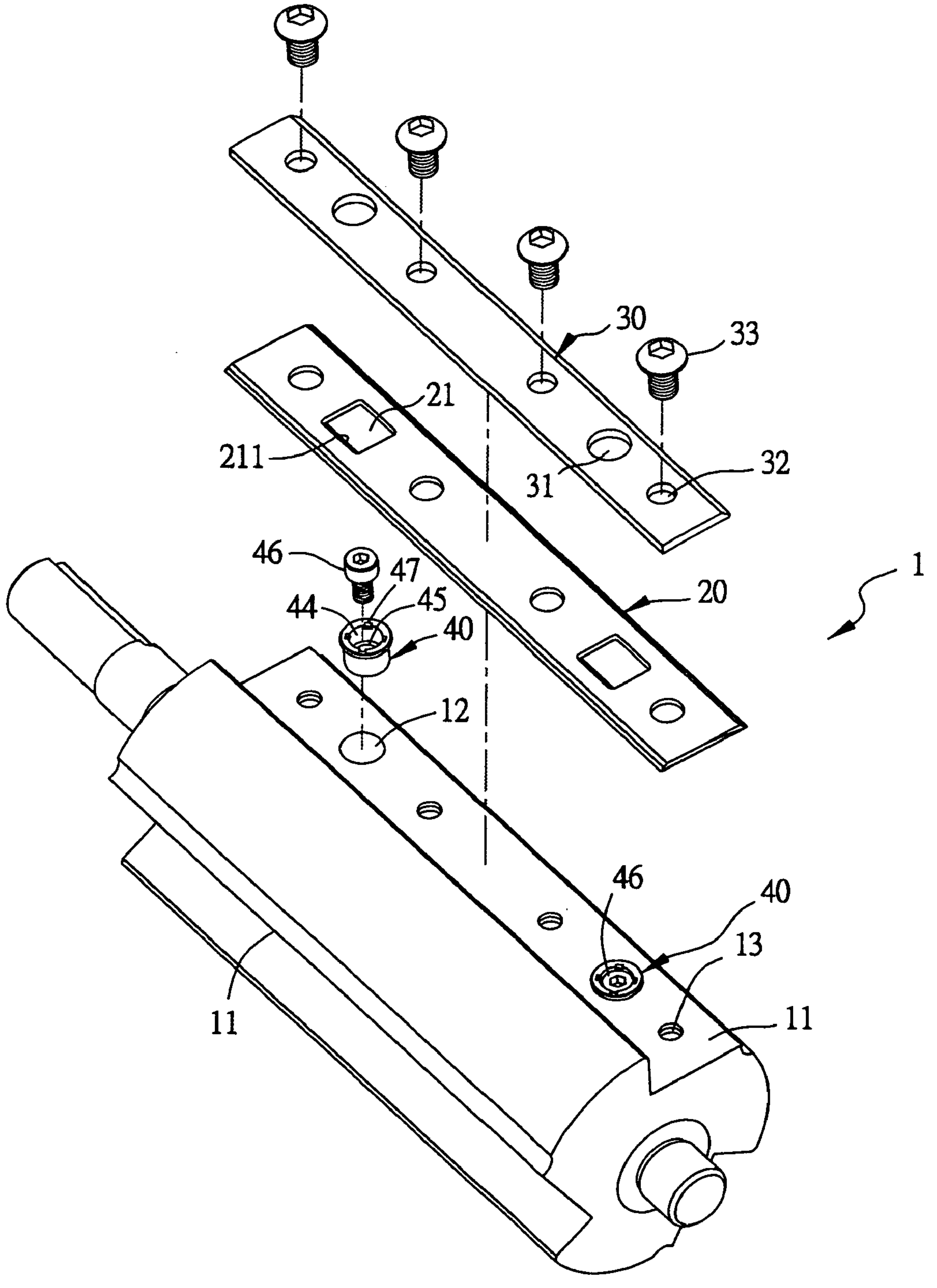
FIG. 2 is a partial exploded perspective view of the plane-blade shaft in the present invention.

A preferred embodiment of a plane-blade adjusting device for a planing machine in the present invention, as shown in FIGS. 1 and 2, includes a plane-blade shaft 1 fixed on a base of a planing machine and having a three set flat surfaces 11 on a shaft body 10, a cover 30 respectively screwed tightly on each set flat surface 1, and a plane blade 20 is sandwiched between the cover 30 and each set flat surface 11.

Figure 3:
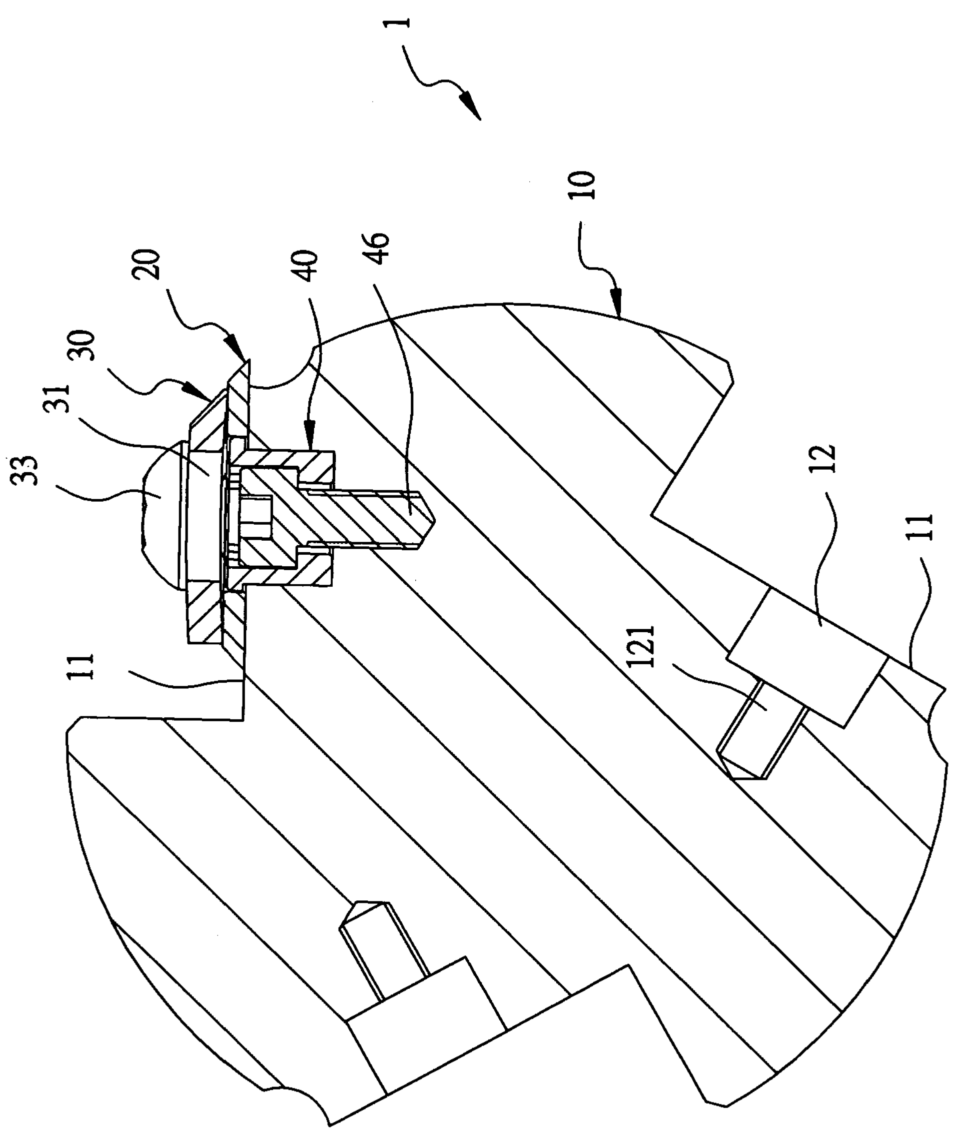
FIG. 3 is a partial cross-sectional view of the plane-blade shaft in the present invention.
Figure 4:
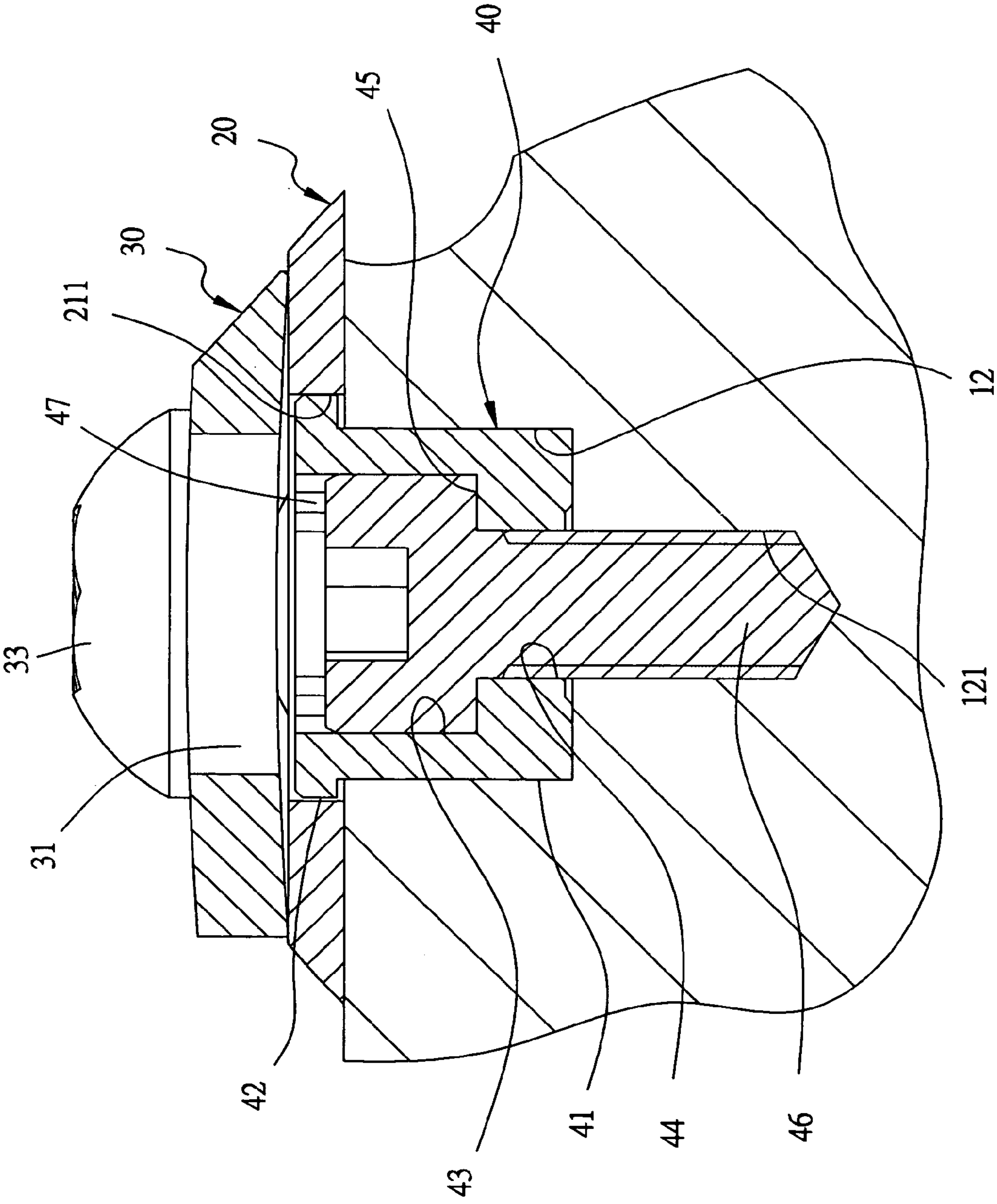
FIG. 4 is a cross-sectional view of the relation of the plane blade and an eccentric tubular post in the present invention.

The shaft body 10, as shown in FIGS. 3 and 4, is provided with two shaft holes 12 spaced apart at two sides of each set flat surface 11, four threaded holes 13 respectively at two sides of each shaft hole 12, and a threaded hole 121 in the center of each shaft hole 12.

The plane blade 20 has a rectangular hole 21 spaced apart in two sides to correspond to the shaft hole 12 of the shaft body 10, a force receiving face 211 formed on an upper and a lower wall of the rectangular hole 21 in parallel to the lengthwise direction of the plane blade 20, and four holes 22 corresponding to the four threaded holes 13 of the shaft body 10.

Each cover 30 is provided with two holes 31 spaced apart in two sides to correspond to the rectangular holes 21 of the plane blade 20, and four holes 32 to correspond to the four holes 22 of the plane blade 20 for screws 33 to fit the holes 31 of the cover 30 and the holes 22 of the plane knife 20 and then screw with the threaded holes 13 of the shaft body 10 to fix tightly the cover 30 and the plane blade 20 on the shaft body 10.

Further, two eccentric tubular posts 40 are provided, respectively fitted in each shaft holes 12 of the shaft body 10, having a rotary portion 41, an eccentric rotary portion 42 located on the rotary portion 41 and in the rectangular hole 21 of the plane blade 20 and contacting and limited by the two force receiving faces 211. The eccentric rotary portion 42 has a center large hole 43 in an upper portion and a small hole 44 communicating with the large hole 43 in the lower portion, and an annular bottom surface 45 formed in the bottom of the large hole 43, so a screw 46 may extend through the large hole 43 and the small hole 44 to engage with the threaded hole 13 of the shaft body 10, pressing on the annular bottom surface 45 at the same time. So the eccentric tubular post 40 is tightly combined with the shaft body 10. Further, the eccentric tubular posts 40 respectively have four notches 47 spaced apart equidistantly in an upper wall of the large hole 43 for a tool to fit therein for rotating the post 40.

Figure 5:
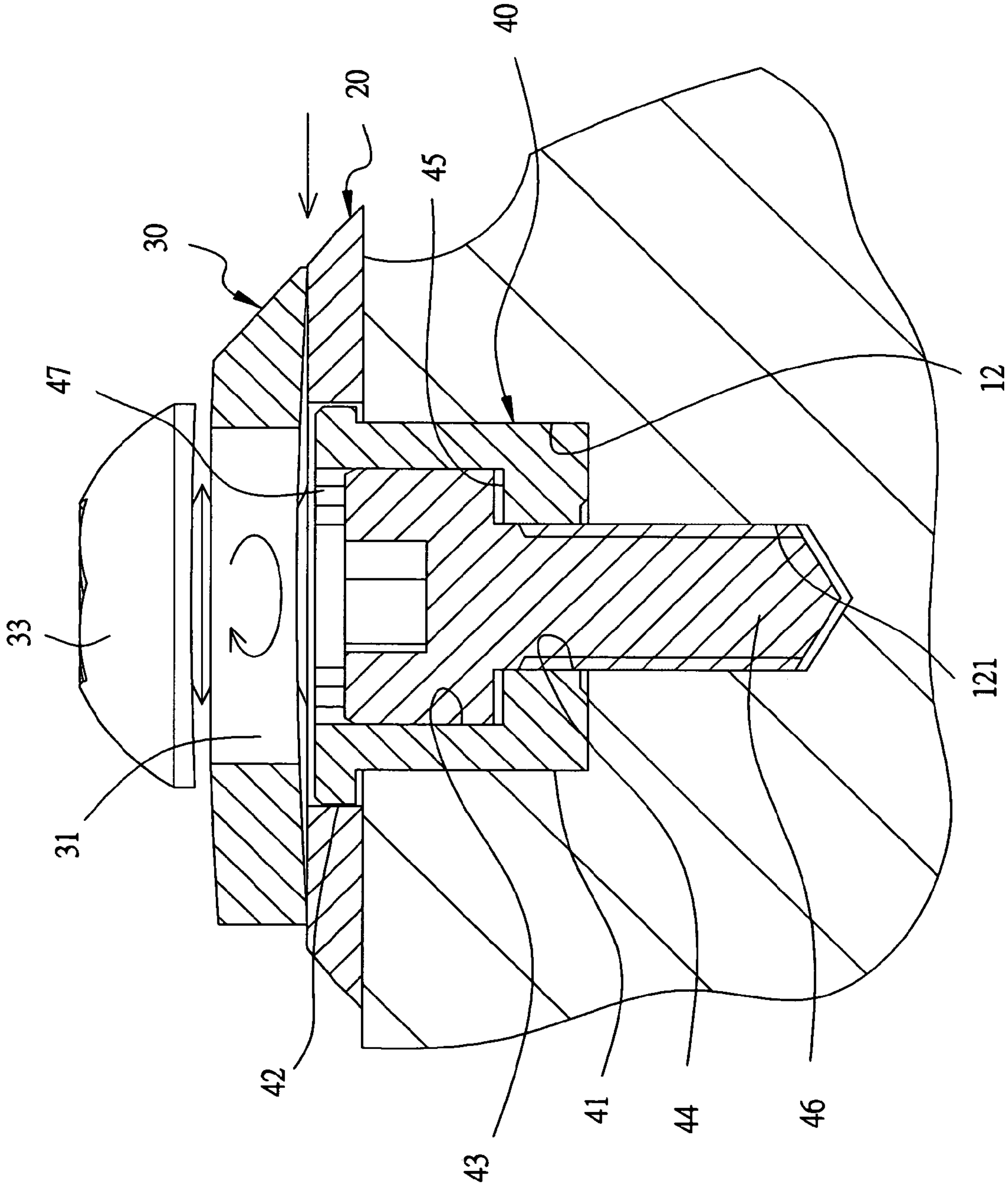
FIG. 5 is a cross-sectional view of the plane blade being micro-adjusted in the present invention.

In adjusting the plane blades 20, referring to FIGS. 4 and 5, firstly, the covers 30 are loosened a little by rotating the screws 33, and then the screws 46 are also screwed loose a bit, permitting the eccentric tubular posts 40 loosen and become rotatable. Then a driver of a straight tip or any other proper tool (not shown) is placed in the notches 47 and rotates the posts 40 with the eccentric rotary portions 42 rotating eccentrically together with the rotary portions 41 functioning as a pivot. Therefore, the plane blades 20 with their rectangular holes 21 may be shifted up or down in a micro-distance, and to a stable position, and then the screws 46 and 33 are orderly tightened again, finishing micro-adjusting the plane blades 20.

It is to be emphasized that the plane blades 20 according to the present invention are micro-adjusted by rotating the eccentric tubular posts 40, so adjusting work is easy, quick and accurate for carrying out, in addition to the simple structure of the device to acquire low cost for manufacture.

While the preferred embodiment of the invention has been described above, it will be recognized and understood that various modifications may be made therein and the appended claims are intended to cover all such modifications that may fall within the spirit and scope of the invention.

What is claimed is:

1. A plane-blade adjusting device for a planing machine, said device comprising: a plane-blade shaft provided with a plurality of set flat surfaces on an outer surface properly spaced apart, a plane blade respectively placed on each said set flat surface, a cover further provided on each said plane blade and screwed tightly with said shaft;

said shaft body provided with at least four shaft holes in each said set flat surface, a threaded hole bored in the center of each said shaft hole;

said plane blades respectively having at least a long hole to correspond to said shaft hole of said shaft body; and at least an eccentric tubular post provided with a rotary portion to fit in said shaft hole of said shaft body, an eccentric rotary portion provided on said rotary portion and limited in its position by a rectangular hole of said plane blade, said eccentric portion shifting together with said rectangular hole so that each said plane blade may be shifted up and down in a micro-distance so as to control the depth of a work to be planed off.

2. The plane-blade adjusting device for a planing machine as claimed in claim 1, wherein said eccentric post is provided with a large hole in the center of an upper portion and a small hole communicating with said large hole in a lower portion, an annular bottom surface formed in the bottom of said large hole, a screw pressing on said annular bottom surface, said eccentric tubular post tightly secured on said blade shaft when said screw passes through said large hole and said small hole to engage with said threaded hole of said shaft body.

3. The plane-blade adjusting device for a planing machine as claimed in claim 1, wherein said eccentric tubular post is provided with a large hole in an upper portion, and a plurality of notches formed in an upper inner wall.

4. The plane-blade adjusting device for a planing machine as claimed in claim 1, wherein said covers and said plane blades are respectively provided with plural holes corresponding to each other, said shaft body is provided with plural threaded holes corresponding to said holes of said covers and said plane blades, and screws are used to fit in said holes and engage said threaded holes for secure tightly said cover and said plane blades with said shaft body.

5. The plane-blade adjusting device for a planing machine as claimed in claim 1, wherein said cover is provided with a hole to align to said eccentric tubular post.

6. The plane-blade adjusting device for a planing machine as claimed in claim 1, wherein said long hole of each said plane blade is rectangular, and provided with a force receiving surface formed on two sidewalls of the long hole parallel to each said plane blade to contact with said eccentric tubular post.

* * * * *